(12) United States Patent
Andre

(10) Patent No.: US 10,414,267 B2
(45) Date of Patent: Sep. 17, 2019

(54) FLUSH-MOUNTED AIR INLET FLAPS

(71) Applicant: Compagnie Plastic Omnium, Lyons (FR)

(72) Inventor: Gérald Andre, Saint Denis en Bugey (FR)

(73) Assignee: Compagnie Plastic Omnium (FR)

( * ) Notice: Subject to any disclaimer, the term of this patent is extended or adjusted under 35 U.S.C. 154(b) by 0 days.

(21) Appl. No.: 15/758,001

(22) PCT Filed: Sep. 2, 2016

(86) PCT No.: PCT/FR2016/052177
§ 371 (c)(1),
(2) Date: Mar. 7, 2018

(87) PCT Pub. No.: WO2017/042457
PCT Pub. Date: Mar. 16, 2017

(65) Prior Publication Data
US 2018/0251020 A1 Sep. 6, 2018

(30) Foreign Application Priority Data
Sep. 7, 2015 (FR) ..................................... 15 58288

(51) Int. Cl.
*B60K 11/08* (2006.01)
*B60H 1/00* (2006.01)
*F16K 1/16* (2006.01)

(52) U.S. Cl.
CPC ........ *B60K 11/085* (2013.01); *B60H 1/00671* (2013.01); *F16K 1/165* (2013.01);
(Continued)

(58) Field of Classification Search
CPC ....... B60K 11/04; B60K 11/08; B60K 11/085; B60H 1/00671; B60H 1/00678
See application file for complete search history.

(56) References Cited

U.S. PATENT DOCUMENTS

| 1,711,215 A | * | 4/1929 | Workman | ............ | B60K 11/085 |
| | | | | | 49/80.1 |
| 1,791,790 A | * | 2/1931 | Burke | .................. | B60K 11/085 |
| | | | | | 123/41.04 |

(Continued)

FOREIGN PATENT DOCUMENTS

| DE | 19652397 A1 | 6/1998 |
| EP | 2457761 A1 | 5/2012 |
| FR | 2825326 A1 | 12/2002 |

*Primary Examiner* — Frank B Vanaman
(74) *Attorney, Agent, or Firm* — St. Onge Steward Johnston & Reens, LLC

(57) ABSTRACT

Device for admitting cooling air to a motor vehicle interior, formed of one or several mobile flaps, each orientable in rotation about an axis by a control mechanism, each flap includes on its external periphery a pressing surface intended, when the mobile flap is in the closed position, to come into contact with a bearing surface. The pressing surface has a point of first contact and a point of last contact with the said bearing surface, these points being defined in such a way that when the control mechanism actuates closure of the mobile flaps and the point of first contact comes into contact with the said bearing surface, the point of last contact is distant from the said bearing surface by a predefined and non-zero distance.

14 Claims, 4 Drawing Sheets

(52) U.S. Cl.
CPC ....... *B60Y 2300/52* (2013.01); *B60Y 2306/05* (2013.01); *Y02T 10/88* (2013.01)

(56) References Cited

U.S. PATENT DOCUMENTS

| | | | | |
|---|---|---|---|---|
| 3,084,715 | A * | 4/1963 | Scharres | F16K 1/165 126/285 R |
| 4,457,558 | A * | 7/1984 | Ishikawa | B60K 11/085 123/41.05 |
| 2008/0133090 | A1 * | 6/2008 | Browne | B60K 11/085 701/49 |
| 2010/0139583 | A1 * | 6/2010 | Klotz | B60K 11/085 123/41.04 |
| 2011/0297468 | A1 * | 12/2011 | Coel | B60K 11/085 180/68.1 |
| 2012/0110909 | A1 * | 5/2012 | Crane | B60K 11/085 49/70 |
| 2013/0333501 | A1 * | 12/2013 | Knauer | B60K 11/085 74/102 |
| 2014/0288788 | A1 * | 9/2014 | Hayakawa | B60K 11/085 701/49 |

* cited by examiner

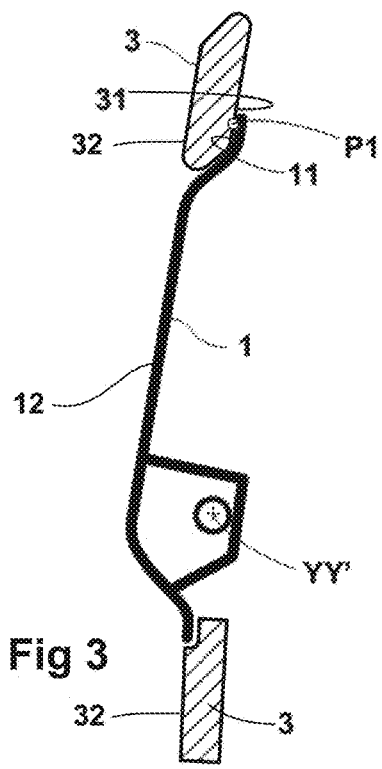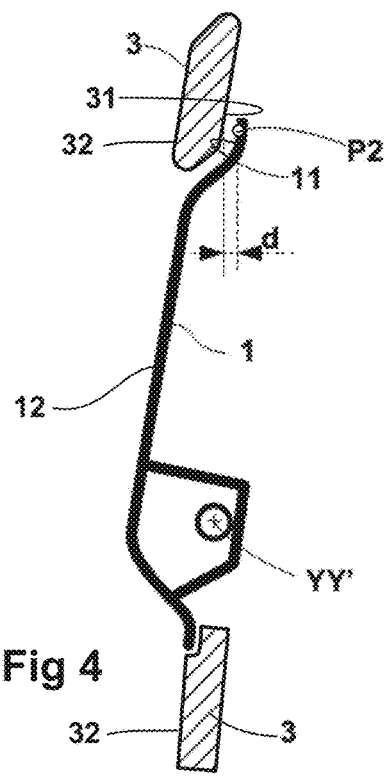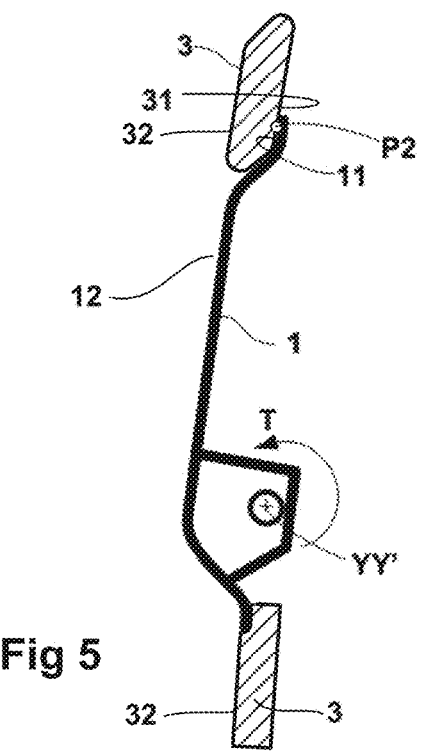

FLUSH-MOUNTED AIR INLET FLAPS

FIELD OF THE INVENTION

The invention concerns the air inlet device of a motor vehicle. The main purpose of this device is to direct ambient air from outside the vehicle towards the engine cooling device in order to promote heat exchanges.

Generally, when the engine is placed at the front of the vehicle, a guide nozzle fitted (or not) with blades is arranged behind the radiator grille to concentrate some of the incoming air towards the front of the radiator.

The most advanced devices now include blades, or mobile flaps to regulate the air supply depending on the optimum thermal regime of the engine, the driving conditions and the outside temperature.

These devices and the mechanisms which drive them, are located behind the radiator grille, or behind any other air inlet located on the vehicle, which is the case for example when the engine is located at the back of the vehicle, and when the air inlets are located laterally on each rear wing. The flaps are then interposed between the radiator and the bars or grille forming the radiator grille and which are visible from outside the vehicle.

However, we observe that, even when the flaps are in the closed position, these air inlets generate non-negligible residual aerodynamic losses due to the presence on the front of the bodywork of the bars or of the grille which protrude with respect to the plane formed by the flaps.

Thus, in order to overcome these aerodynamic disadvantages, it has been proposed to arrange these flaps directly on the front of the vehicle, and therefore make them visible from the outside.

The mobile air inlet flaps thus represent a feature of the style and general external appearance of the vehicle and must therefore blend as harmoniously as possible in the general profile of the bodywork and be in "general continuity of shape" with the parts of the bodywork surrounding the said air inlet.

This concern is most important when the flaps are in the closed position, and the surfaces of the flaps must then be connected with the visible surfaces of the outside of the fixed parts of the bodywork surrounding the flaps, and in which the flaps are integrated. These fixed parts may be formed by any part of the vehicle adjacent to the air inlet devices, such as the front face or radiator grille, bumper, bonnet, or side wings.

In the closed position, therefore, the outer surface of the flaps must be flush at the interfaces, and in "general continuity of shape", with the outer surfaces of the fixed parts of the bodywork surrounding the flaps, so as to improve the air flow, and to reduce as much as possible the adverse effects on the aerodynamics associated with the presence of roughness or shape irregularities. This performance must be guaranteed in particular when the flaps are closed, and the vehicle is driving at high speed. As will be seen below, this last requirement has an effect on the mechanical strength and the airtightness of the flaps.

Moreover, this continuity of shape gives the vehicle a neat stylish effect.

Here, general continuity of shape between two separate parts forming the visible part of the bodywork, in this case between the flaps, or between the flaps and the surface of the bodywork surrounding them, means the fact that any straight line passing through any first point, visible from the outside and located on the periphery of the outer surface of a part, and through a second point closest to this first point, also visible from the outside and located on the periphery of the outer surface of the other part, is substantially tangential to the outer surface of each of the two parts.

OBJECT AND SUMMARY OF THE INVENTION

The invention aims to provide an original solution to the problem described above.

The device for admitting cooling air to a motor vehicle according to the invention is formed of one or several flaps, each orientable in rotation about an axis by a control mechanism, each flap comprising on its external periphery a pressing surface intended, when the flap is in the closed position, to come into contact with a bearing surface. This device is characterised in that the pressing surface comprises a point of first contact and a point of last contact with the said bearing surface, these points being defined in such a way that when the said control mechanism actuates closure of the flaps and the point of first contact comes into contact with the said bearing surface, the point of last contact is distant from the said bearing surface by a predefined and non-zero distance.

Complete closure of the flap then takes place by applying, via the control mechanism, a pressing torque to the axis of rotation so that all points of the pressing surface rest on the bearing surface, until the point of last contact is in contact with the said bearing surface.

Thus, contrary to what might be expected, it turns out that it is better to manufacture the flap so that its shape in the unstressed state is slightly different from that of the flap stressed in the closed position, which corresponds to the shape required by the designer responsible for the vehicle design. This deliberate "pre-deformation" of the mobile flap can be used to predefine the location of the points of first and last contact and ensure that the flap closes perfectly.

As a result, as soon as the point of first contact touches the bearing surface, the control mechanism generates a closing torque, which causes a progressive deformation of the flap until all the points of the pressing surface come into contact with the bearing surface and until the point of last contact is itself in contact with the bearing surface.

Thus, it has been demonstrated that, when the profile in the unstressed state of the external periphery of the flap corresponds to the exact profile of the bearing surface, and due to geometrical dispersions related to manufacture, assembly, mechanical clearances and wear of parts, the pressing surface of the flap does not coincide in a perfectly complementary manner with the surface of the bearing surface and shows, in the closed position, gaps that are unacceptable as regards firstly the quality of flushness of the surfaces, and secondly the required airtightness.

The air inlet device according to the invention may also comprise separately, or in combination, the following characteristics:

the point of last contact of a flap comes into contact with
  the said bearing surface under the effect of:
    a pressing torque generated by the control mechanism,
      and
    an elastic deformation of the flap,
so that all the points of the pressing surface of the mobile flap come into contact with the said bearing surface.
  the pressing torque applied by the control mechanism is at
    least equal to, and preferably greater than, the sum of
    a torque required to create the elastic deformation of
    the flap until the point of last contact rests against the
    bearing surface, and a torque required to overcome the aerodynamic pressure exerted on the said flap when the vehicle is driving at high speed.

the value of the predefined distance is between 2 mm and 10 mm and preferably between 3 mm and 5 mm.

the distance between the axis of rotation and an edge of the mobile flap is less than a quarter of the largest width of the flap measured in a direction substantially perpendicular to the axis of rotation.

the point of first contact is arranged at the point of the pressing surface located at a distance as far away as possible from the axis of rotation.

the bearing surface of a mobile flap is arranged wholly or partially on a fixed part of the vehicle bodywork surrounding the said mobile flaps.

the bearing surface of a mobile flap is formed wholly or partially by the pressing surface located on one or more adjacent flaps.

the axes of the mobile flaps are not parallel to each other.

outer surfaces of the mobile flaps are surfaces visible from outside the vehicle.

in the closed position, the outer surfaces of the mobile flaps are in general continuity of shape with the outer surfaces of the adjacent flaps and with bodywork surfaces visible from the outside and surrounding the said mobile flaps.

a seal is arranged between the pressing surface of the mobile flaps and the bearing surface.

The invention also concerns the bodywork of a vehicle comprising an air inlet device according to any one of the preceding characteristics.

BRIEF DESCRIPTION OF THE DRAWINGS

The invention will be better understood on reading the accompanying figures, which are given solely by way of example and not limiting in any way, in which:

FIG. 3 is a diagrammatic cross-sectional view along plane C1 of the flap when the first point of contact comes into contact with the bearing surface.

FIG. 4 is a diagrammatic cross-sectional view along plane C2 of the flap when the first point of contact comes into contact with the bearing surface.

FIG. 5 is a diagrammatic cross-sectional view along plane C2 of the flap when a torque is applied to the axis of rotation by the control mechanism and when the point of last contact comes into contact with the bearing surface.

DETAILED DESCRIPTION OF THE INVENTION

Figure 1:
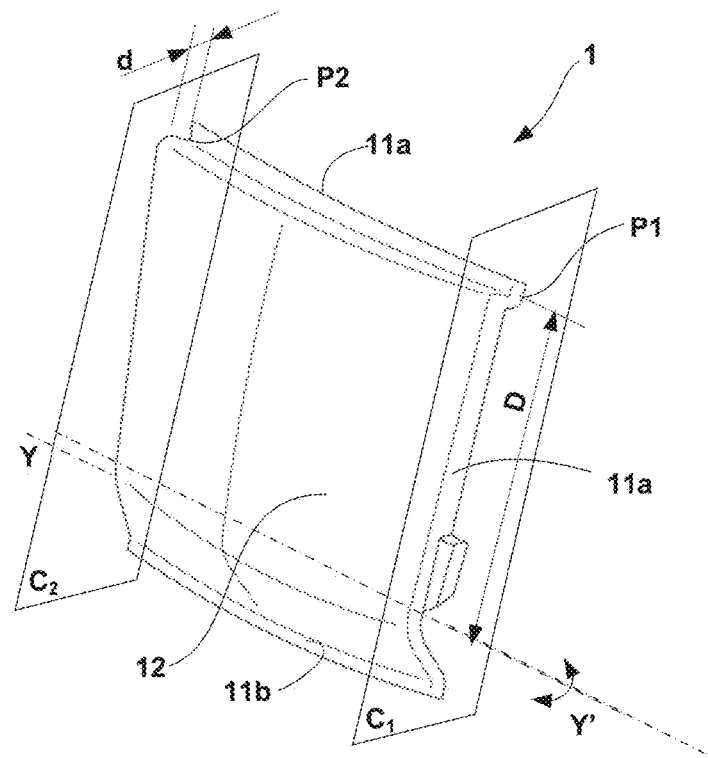
FIG. 1 is a perspective view of a flap according to the invention.

FIG. 1 is a simplified illustration of an air inlet flap 1. This flap is mobile in rotation about an axis YY' under the action of a control mechanism (not shown).

In the closed position, the surface 12 of the flap is oriented towards the outside of the vehicle and participates in the general external shape of the vehicle, A pressing surface 11 is arranged on the periphery of the mobile flap. Depending on its arrangement relative to the axis of rotation YY', the pressing surface 11 is placed on the face of the mobile flap oriented towards the outside of the vehicle (11a) or on the face of the mobile flap oriented towards the inside the vehicle (11b).

Figure 2:
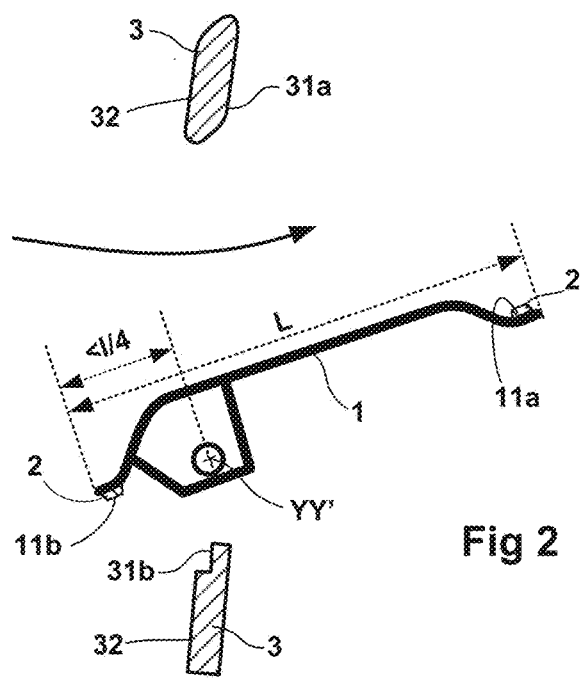
FIG. 2 is a diagrammatic cross-sectional view along plane C1 of the flap in the partially open position.

FIG. 2 illustrates the mobile flap in the partially open position relative to the components of the bodywork 3 considered as fixed and forming, with respect to the flaps, the fixed parts of the bodywork surrounding the one or more flaps.

This fixed part comprises a bearing surface 31, with which the pressing surface 11 is intended to come into contact when the mobile flap is in the closed position.

Conversely to the mobile flap, the surface of the bearing surface 31 is oriented towards the outer part (31b) of the vehicle, when the pressing surface (11b) is oriented towards the inside of the vehicle, and towards the inside of the vehicle (31a) when the pressing surface (11a) is oriented towards the outside of the vehicle.

The bearing surface 31 on which the pressing surface rests when the mobile flap is in the closed position can be represented as a closed line in the three-dimensional space.

When the mobile flap is in the unstressed state, i.e. when the pressing surface 11 of the mobile flap 1 is not in contact with the bearing surface 31, the pressing surface 11 of the mobile flap can also be represented as a closed line in the three-dimensional space.

When the flap is in the unstressed state, these two lines are not exactly superimposed.

Thus, as explained above, the mobile flap is designed and manufactured so that it is slightly curved. This controlled "pre-deformation" is obtained by twisting the surface of the flap about an axis substantially perpendicular to the axis of rotation YY'. In other words, the shape of the flap in the unstressed state corresponds to that which would be obtained on a flap whose shape of the pressing surface would precisely correspond to the shape of the bearing surface, and on the axis of rotation to which a torque would be applied, while keeping the point of first contact in a fixed position.

When closing, and under the action of the closing mechanism, as shown on FIG. 3, the pressing surface 11 comes into contact with the bearing surface 31 via a point of first contact P1.

The closing mechanism then applies a pressing torque T to the axis YY' so as to force, under the effect of the elastic deformation of the mobile flap, all points of the pressing surface 11 to come into contact with the bearing surface 31, until the point P2, considered in this case as the point of last contact, rests on the bearing surface 31. Complete closure of the mobile flap is shown on FIG. 5. In addition, the closed lines of the pressing surface and of the bearing surface have perfectly complementary shapes so that the final shape of the flap in the closed position corresponds to the shape required by the designer.

When the point of the first contact P1 rests against the bearing surface 31, and if the pressing torque T is not applied, the point of last contact P2, supported by the pressing surface 11, is distant from the bearing surface 31 by a predefined value d, as shown on FIG. 4.

This distance d may be relatively small, and is evaluated according to the size of the mobile flaps. It may usefully lie between 2 mm and 10 mm and preferably between 3 mm and 5 mm.

The pressing torque applied by the closing mechanism is determined by the stiffness of the mobile flap. When designing the mobile flap therefore, care should be taken to ensure that this component can deform without the need to exert excessive forces while ensuring that the mobile flap is stiff enough to withstand the pressure exerted by the air when the vehicle is driving at high speed.

To facilitate this elastic deformation, we must therefore ensure that the point of first contact P1 is arranged at a distance D as far away as possible from the axis of rotation YY', as shown on FIG. 1. When the flap is in the open position, this optimisation also reduces the part of the flap protruding towards the outside of the bodywork.

To increase this distance D, the axis of rotation YY' could be placed as close as possible to one of the edges of the periphery of the mobile flap, preferably locating it at less than a quarter of the largest width of the flap measured in a direction substantially perpendicular to the axis of rotation, as shown on FIG. 2.

However, when carrying out this optimisation, care should be taken to ensure that the torque induced by the aerodynamic pressure applied to the surface of the mobile flap in the closed position when the vehicle is driving at high speed, and which opposes the pressing torque, remains less or even much less than the said pressing torque exerted on the mobile flap by the closing mechanism, so that, in this configuration, and under these driving conditions, the point of last contact P2, which is also the least stressed point pressing on the bearing surface, always remains in contact with the bearing surface 31.

Thus, the pressing torque applied by the closing mechanism is at least equal to, and preferably greater than, the sum of the torque required to create the elastic deformation of the flap until the point of last contact P2 rests on the bearing surface 31 when closing the flap and when the vehicle is stationary, and the torque required to overcome the aerodynamic pressure exerted on the flaps when the vehicle is driving at high speed.

The principle used to design the mobile flaps, as described above, makes it possible to control the pressing of the pressing surface 11 on the bearing surface 31, and to improve the general continuity of shape between the visible part of the flaps 12 and the fixed components of the bodywork 32, also visible from the outside, while guaranteeing better airtightness when the flap is in the closed position.

To improve this airtightness, a flexible seal 2 can be positioned between the bearing surface 31 and the pressing surface 11, as shown on FIG. 2. The seal can be fixed, for example by bonding to the bearing surface 31 or to the pressing surface 11. However, for aesthetic reasons, the seal can be positioned simultaneously on the parts of the pressing surface 11 and of the bearing surface 31 which are not visible from the outside when the flap is in the open position.

Figure 6:
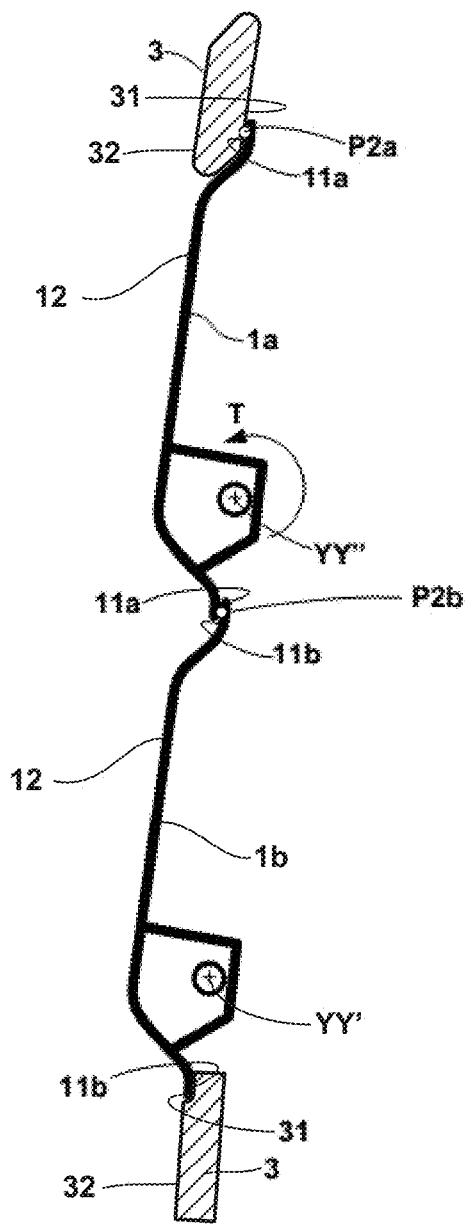
FIG. 6 is a diagrammatic cross-sectional view of an air inlet device comprising two superimposed flaps in the closed position.

FIG. 6 illustrates the case in which the air inlet mechanism comprises a plurality of flaps adjacent to each other.

This configuration can be chosen for style effects or, if the air inlet has a large cross-section, to distribute the aerodynamic pressure exerted on the flaps over several of them.

Each flap pivots about its axis YY'.

Note that, in this configuration, the axes YY' are not necessarily parallel to each other. The angle formed by the axes of rotation of two mobile flaps may reach 10°.

In the example shown on FIG. 6, the air inlet device comprises two flaps 1a and 1b.

In the closed position, the point of last contact P2a of the flap 1a of the pressing surface 11a rests on the bearing surface 31 of the fixed part 3. In addition, the point of last contact P2b of the pressing surface 11b of the flap 1b rests on the pressing surface 11a of the flap 1a acting as bearing surface.

When the air inlet device comprises several flaps, the bearing surface of the flaps is therefore partly located on the pressing surface of an adjacent flap.

Note that the pressing torque applied to the flap 1b opposes the pressing torque of the flap 1a, and is added to the torque generated by the aerodynamic pressure exerted on the flap 1a.

Care should therefore be taken to arrange the respective positions of the axis of rotation of each flap properly, and to determine the value of the pressing torques to ensure that the flaps are correctly closed when the vehicle is driving at high speed.

Figure 7:
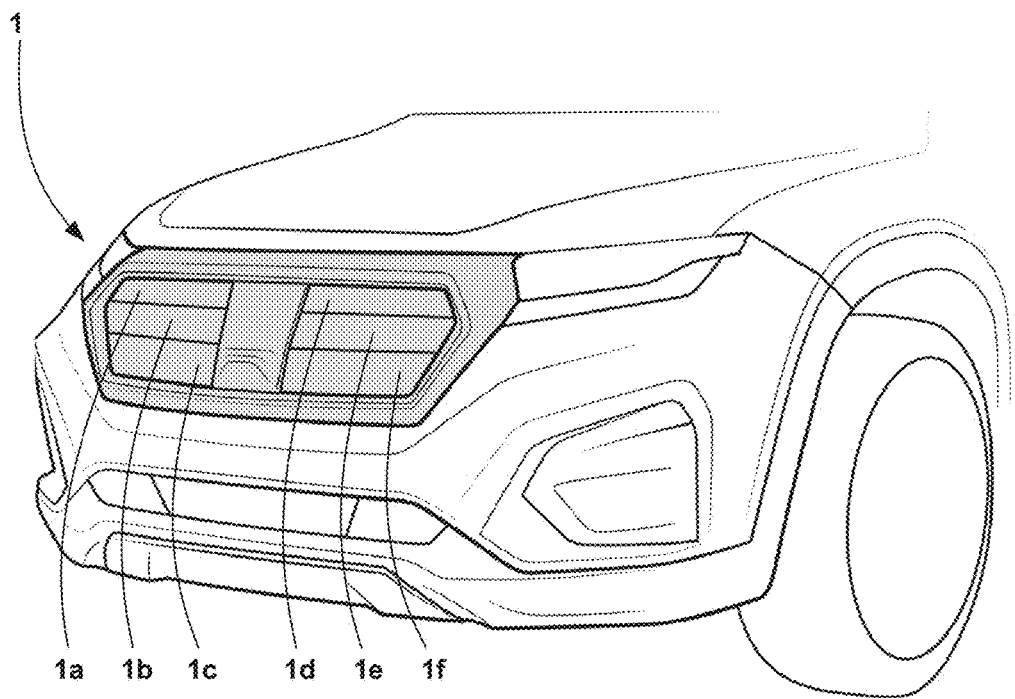
FIG. 7 is a general perspective view of the front part of a vehicle comprising an air inlet device according to the invention.

FIG. 7 illustrates the front part of the bodywork of a motor vehicle whose radiator grille is fitted with an air inlet device according to the invention. The flaps 1a, 1b, 1c, 1d, 1e and 1f are in the closed position and are in general continuity of shape relative to each other and with the fixed parts of the radiator grille.

NOMENCLATURE

1 Mobile air inlet flap.
1a First mobile flap.
1b Second mobile flap.
1c, 1d, 1e, 1f Mobile flaps.
11 Pressing surface of the mobile flap.
11a Pressing surface of the mobile flap oriented towards the outside of the vehicle.
11b Pressing surface of the mobile flap oriented towards the inside of the vehicle.
12 Outer surface of the mobile flap.
2 Seal.
3 Fixed part of the vehicle.
31 Bearing surface on which the pressing surface rests in the closed position.
31a Bearing surface oriented towards the inside of the vehicle.
31b Bearing surface oriented towards the outside of the vehicle.
32 Outer surface of the fixed part forming the bodywork visible from outside the vehicle.
P1 Point of first contact between the pressing surface and the bearing surface.
P2 Point of last contact between the pressing surface and the bearing surface.
P2a Point of last contact of the first mobile flap.
P2b Point of last contact of the second mobile flap.
T Pressing torque exerted by the closing mechanism to the axis YY'.
YY' Axis of rotation of the mobile flaps.
d Predefined distance between the point of second contact and the bearing surface when the point of first contact rests on the said bearing surface.
D Distance between the point of first contact and the axis of rotation of the mobile flap.

The invention claimed is:

1. A device for admitting cooling air to a motor vehicle interior comprising: at least one mobile flap orientable in rotation about an axis by a control mechanism, said at least one mobile flap comprising on its external periphery a pressing surface such that, when the at least one mobile flap is in a closed position the pressing surface comes into contact with a bearing surface, wherein the pressing surface comprises points including a point of first contact and a point of last contact with said bearing surface, the points being defined in such a way that
> when the control mechanism actuates closure of the at least one mobile flap and the point of first contact comes into contact with said bearing surface, the point of last contact is distant from the said bearing surface by a predefined and non-zero distance and,
> the point of last contact of the at least one mobile flap comes into contact with said bearing surface under the effect of:
> a pressing torque generated by the control mechanism, the pressing torque twisting the surface of the at least one mobile flap about a further axis substantially perpendicular to the axis while keeping the point of first contact in a fixed position, and
> an elastic deformation of the at least one mobile flap, so that all the points of the pressing surface of the at least one mobile flap come into contact with said bearing surface.

2. The device according to claim 1, wherein the pressing torque applied by the control mechanism is at least equal to or greater than a torque required to create the elastic deformation of the flap until the point of last contact rests against the bearing surface.

3. The device according to claim 1, wherein the value of the predefined and non-zero distance is between 2 mm and 10 mm.

4. The device according to claim 3, wherein the distance between the axis of rotation and an edge of the at least one mobile flap is less than a quarter of a largest width of the at least one mobile flap measured in a direction substantially perpendicular to the axis.

5. The device according to claim 4, wherein the point of first contact is arranged at a point of the pressing surface located at a distance as far away as possible from the axis of rotation.

6. The device according to claim 3, comprising several mobile flaps, and wherein the bearing surface upon which the pressing surface of a first mobile flap comes into contact in the closed position is formed wholly or partially by a pressing surface located on one or more mobile flap adjacent to said first mobile flap.

7. The device according to claim 6, wherein the at least one mobile flap comprises at least two mobile flaps and the axis, about which the at least two mobile flaps are orientable in rotation, are not parallel to each other.

8. The device according to claim 6, wherein, in the closed position, the outer surface of the at least one mobile flap is in general continuity of shape with the outer surface of an adjacent one of the at least one mobile flap and with bodywork surfaces visible from the outside and surrounding said at least one mobile flap.

9. The device according to claim 1, wherein the bearing surface upon which the pressing surface of the at least one mobile flap comes into contact in the closed position is arranged wholly or partially on a fixed part of bodywork of the vehicle surrounding said at least one mobile flap.

10. The device of claim 1 being located on bodywork of the vehicle.

11. The device according to claim 1, wherein the value of the predefined and non-zero distance is between 3 mm and 5 mm.

12. The device according to claim 1 wherein the outer surfaces of the at least one mobile flap is a surface visible from outside the vehicle.

13. The device according to claim 1 wherein in the closed position, the outer surface of the at least one mobile flap is in general continuity of shape with bodywork surfaces visible from the outside and surrounding said at least one mobile flap.

14. The device according to claim 1 wherein a seal is arranged between the pressing surface of the at least one mobile flap and the bearing surface of the at least one mobile flap.

* * * * *